US009031716B2

(12) United States Patent
Myers et al.

(10) Patent No.: US 9,031,716 B2
(45) Date of Patent: May 12, 2015

(54) INFORMATION HANDLING FOR AIRCRAFT FLIGHT DECKS

(75) Inventors: Robert James Myers, Mukilteo, WA (US); Timothy William Anstey, Seattle, WA (US); Peter James Batsakes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 356 days.

(21) Appl. No.: 13/432,190

(22) Filed: Mar. 28, 2012

(65) Prior Publication Data

US 2013/0261847 A1 Oct. 3, 2013

(51) Int. Cl.
*H04L 29/00* (2006.01)
*G08G 5/00* (2006.01)
*H04L 12/58* (2006.01)
*H04L 29/06* (2006.01)
*H04L 29/08* (2006.01)

(52) U.S. Cl.
CPC ............ *G08G 5/0004* (2013.01); *G08G 5/0021* (2013.01); *H04L 51/26* (2013.01); *H04L 63/14* (2013.01); *H04L 63/20* (2013.01); *H04L 67/12* (2013.01)

(58) Field of Classification Search
CPC ......... H04L 67/12; H04L 67/14; H04L 63/14; H04L 63/20; G08G 5/0004
USPC .......................................................... 701/3
See application file for complete search history.

(56) References Cited

U.S. PATENT DOCUMENTS 7,142,854 B1 * 11/2006 Kauffman et al. ............ 455/431
7,283,064 B2   10/2007 He
7,466,980 B2 * 12/2008 Kauffman et al. ............ 455/431
7,581,002 B2    8/2009 Royalty
7,962,748 B2 *  6/2011 Royalty ......................... 713/168
8,315,762 B2 * 11/2012 Correa et al. ................... 701/36
8,340,067 B2 * 12/2012 Buga et al. .................... 370/338
8,341,298 B2 * 12/2012 Wilber et al. ................. 709/249

(Continued)

FOREIGN PATENT DOCUMENTS

EP        2434727 A1     3/2012

OTHER PUBLICATIONS

Kingsley-Jones, "Airbus outlines key features of A350 flightdeck, takes innovative electronic flight bag approach", Flight, Jul. 2009, 2 Pages, accessed Feb. 20, 2012, http://www.flightglobal.com/news/articles/airbus-outlines-key-features-of-a350-flightdeck-takes-innovative-electronic-flight-bag-330426/.

(Continued)

*Primary Examiner* — John Q Nguyen
*Assistant Examiner* — Michael Whalen
(74) *Attorney, Agent, or Firm* — Yee & Associates, P.C.

(57) ABSTRACT

A system and method for handling information for use on a flight deck network on an aircraft. Information is received from a number of information sources. The number of information sources is not part of the flight deck network. The flight deck network is a certified network. It is determined whether the information is approved to be used on the flight deck network. A manner in which the information is allowed to be used on the flight deck network is also determined. Responsive to a determination that the information is approved to be used on the flight deck network, the information is sent to the flight deck network during operation of the aircraft.

19 Claims, 7 Drawing Sheets

(56) References Cited

U.S. PATENT DOCUMENTS

| | | | |
|---|---|---|---|
| 8,369,295 B2* | 2/2013 | Thompson | 370/338 |
| 2004/0122956 A1* | 6/2004 | Myers et al. | 709/228 |
| 2006/0183474 A1* | 8/2006 | Ziarno et al. | 455/431 |
| 2006/0206246 A1* | 9/2006 | Walker | 701/16 |
| 2006/0227012 A1 | 10/2006 | He | |
| 2006/0252422 A1* | 11/2006 | Kauffman et al. | 455/431 |
| 2007/0111725 A1* | 5/2007 | Kauffman et al. | 455/431 |
| 2007/0127460 A1* | 6/2007 | Wilber et al. | 370/389 |
| 2007/0136460 A1* | 6/2007 | Starr et al. | 709/224 |
| 2008/0046962 A1* | 2/2008 | Yukawa et al. | 726/1 |
| 2008/0052517 A1* | 2/2008 | Anstey et al. | 713/176 |
| 2008/0086554 A1 | 4/2008 | Royalty | |
| 2008/0119968 A1* | 5/2008 | Loda | 701/3 |
| 2009/0070841 A1* | 3/2009 | Buga et al. | 725/116 |
| 2009/0319099 A1* | 12/2009 | Corbefin et al. | 701/3 |
| 2010/0190510 A1* | 7/2010 | Maranhas et al. | 455/456.1 |
| 2010/0195634 A1* | 8/2010 | Thompson | 370/338 |
| 2010/0262715 A1* | 10/2010 | Tamalet et al. | 709/238 |
| 2012/0003922 A1* | 1/2012 | Buga et al. | 455/3.01 |
| 2012/0030717 A1* | 2/2012 | Buga et al. | 725/76 |
| 2014/0136658 A1* | 5/2014 | Wahler | 709/218 |

OTHER PUBLICATIONS

"The future is too long to wait", Primus Epic specification, Honeywell Aerospace, Oct. 2008, 4 Pages.

"A new era for the Bombardier Global Vision flight deck", Pro Line Fusion Advanced Avionics, Rockwell Collins, copyright 2011, 8 Pages.

"Collins Pro Line 21 Integrated Flight Information System," Beechcraft King Air B200/B300, Beechcraft Premier I/IA Hawker 800 XP, Hawker Beechcraft Services, copyright 2007, 1 page, accessed Aug. 28, 2013, http://www.beechcraft.com/customer_support/TECHNICAL_AND_FIELD_SUPPORT/AFTERMARKETSTCS/VIEW.ASPX?ID=72.

PCT search report dated Jul. 19, 2013 regarding application PCT/US2013/024157, international filing date Jan. 31, 2013, applicant The Boeing Company, 10 pages.

* cited by examiner

INFORMATION HANDLING FOR AIRCRAFT FLIGHT DECKS

BACKGROUND INFORMATION

1: Field

The present disclosure relates generally to aircraft flight decks and to handling the information that is used on aircraft flight decks and displayed on aircraft flight deck display systems. More particularly, the present disclosure relates to handling non-essential information from sources outside of the aircraft flight deck network for use on the aircraft flight deck during operation of the aircraft and controlling the manner in which the non-essential information is displayed on the flight deck.

2: Background

A flight deck is the area on an aircraft from which a pilot and other flight crew members control the aircraft. The flight deck is usually located near the front of an aircraft. The flight deck also may be referred to as the cockpit. In addition to a pilot, the flight crew on the flight deck during operation of the aircraft may include, for example, a copilot, a navigator, or other personnel or combinations of personnel.

The flight deck of an aircraft includes the instruments and controls that enable the flight crew to fly the aircraft. For example, the flight deck may include a number of displays. Various types of information may be displayed for use by the flight crew to operate the aircraft. For example, it is desirable that the information displayed on the aircraft flight deck includes information that may be required for use by the flight crew to operate the aircraft safely.

It is desirable that the information used by the flight crew on the aircraft flight deck is handled to ensure safe operation of the aircraft. For example, the information displayed on the aircraft flight deck may be controlled to ensure that the information displayed to the aircraft flight crew is both appropriate and accurate.

Control of the information used on the aircraft flight deck may be provided by separating the aircraft flight deck network from other data processing systems on the aircraft. This separation may be implemented by physical separation of the hardware used to implement the aircraft flight deck network from other data processing system hardware on the aircraft. For example, the aircraft flight deck network may be implemented as a local area network or other grouping of data processing resources that is physically separated from other data processing systems and networks on the aircraft. As another example, software may be used to separate the aircraft flight deck network from other aircraft network data processing systems.

The separation of the flight deck data processing network from the other aircraft network data processing systems allows the information used on the aircraft flight deck to be separated from the information used by other aircraft network data processing systems. For example, the information to be used on the aircraft flight deck may be stored in a database that is only accessible by the aircraft flight deck network during operation of the aircraft. For example, such a database may be part of the flight deck local area network that includes the flight deck display system.

The information used on the aircraft flight deck network may be further controlled by subjecting the flight deck network to a certification process. For example, information to be used on the aircraft flight deck network may be stored on a database that is accessible by the aircraft flight deck network. The flight deck network, including the database and flight deck display system, may be subject to the certification process. The certification process may be performed to verify that the information to be used on the flight deck network satisfies a number of requirements related to the appropriateness and accuracy of the information. Typically, the certification process may be conducted and granted by a regulatory authority. In some cases the certification process may be conducted by another entity.

Changes to the flight deck network, including changes for using information from new information sources or in new formats, typically may require recertification. Processes for certifying the components of the flight deck network may be time-consuming and costly. As a result, changes to the aircraft flight deck network may be delayed due to the time required for the certification process. In other cases, changes to the aircraft flight deck network may be delayed or not undertaken at all, in order to delay or avoid entirely the costs associated with the certification process.

Current methods for handling information used on aircraft flight decks that rely on certification processes and separating the flight deck network from other aircraft network data processing systems form a closed system. The inflexibility of such a system discourages system changes and, thus, may limit the information that is available to be used by the flight crew on the aircraft flight deck.

Accordingly, it would be beneficial to have a method and apparatus that takes into account one or more of the issues discussed above as well as possibly other issues.

SUMMARY

An illustrative embodiment of the present disclosure provides a method for handling information for use on a flight deck network on an aircraft. Information is received from a number of information sources. The number of information sources is not part of the flight deck network. The flight deck network is a certified network. It is determined whether the information is approved to be used on the flight deck network. A manner in which the information is allowed to be used on the flight deck network is also determined. Responsive to a determination that the information is approved to be used on the flight deck network, the information is sent to the flight deck network during operation of the aircraft.

Another illustrative embodiment of the present disclosure provides a method for handling information on a flight deck network on an aircraft. During operation of the aircraft, a request is sent from the flight deck network for information to be used on the flight deck network. The flight deck network is a certified network. In response to the request, the information to be used on the flight deck network is received from a source of information that is not part of the flight deck network. The information is used on the flight deck network during operation of the aircraft while other information that is part of the flight deck network is simultaneously used on the flight deck network.

Another illustrative embodiment of the present disclosure provides an apparatus comprising an information controller on an aircraft. An information receiver is configured to receive information from a number of information sources. The number of information sources is not part of a flight deck network on the aircraft. The flight deck network is a certified network. An approved information checker is configured to determine whether information received by the information receiver is approved to be used on the flight deck network. An allowed uses tagger is configured to associate data with the information received by the information receiver. The data indicates a manner in which the information is allowed to be used on the flight deck network. An information request handler is configured to receive a request from the flight deck network during operation of the aircraft to send information to the flight deck network, and, in response to receiving the request, to send information that is determined to be approved to be used on the flight deck network with the data to the flight deck network.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
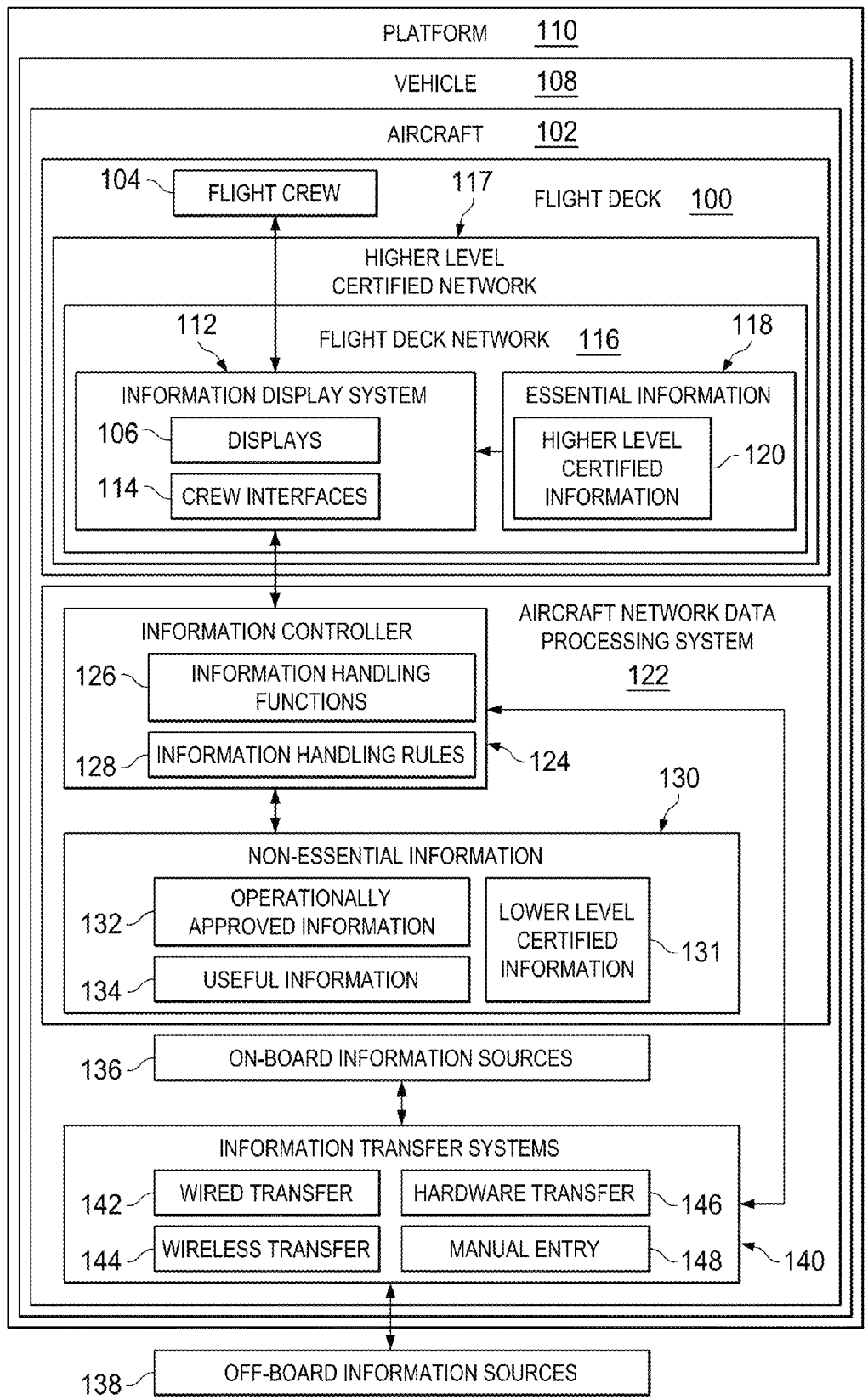
FIG. 1 is an illustration of a block diagram of a system for handling information for use on an aircraft flight deck in accordance with an illustrative embodiment.

The different illustrative embodiments recognize and take into account a number of different considerations. "A number", as used herein with reference to items, means one or more items. For example, "a number of different considerations" means one or more different considerations.

The different illustrative embodiments recognize and take into account that current systems and methods for handling the information that is used on an aircraft flight deck includes separating the aircraft flight deck network from other aircraft network data processing systems. The separated aircraft flight deck network is subject to a certification process or requirement. This separation of a certified flight deck network from other aircraft network data processing systems allows only information that is certified for use on the flight deck to be accessed by the aircraft flight deck network. Changes to the flight deck network may require recertification.

The different illustrative embodiments recognize and take into account that there may be different levels of certification for aircraft systems and for the information that is used on aircraft. A higher level of certification may require a certification process that is more time consuming and expensive than the certification process required for a lower level of certification. Components of a flight deck network, including information that is a part of the flight deck network, may require a higher level of certification than other systems and information that may be used on an aircraft. Therefore, changes to the flight deck network that require recertification may be more time consuming and expensive than changes to other aircraft systems.

Current systems and methods for handling the information on aircraft flight deck networks that rely on flight deck network separation and certification result in a closed system. Such a system may be inflexible and may limit the information that is available to be used by a flight crew on the aircraft flight deck network. Essential information that is required for safe operation of the aircraft is made available for use by flight crews on the flight deck network. However, non-essential information from new information sources or new display formats may not be made available on the flight deck in a timely manner or at all.

The different illustrative embodiments recognize and take into account that certain information may be useful for operation of an aircraft, even if such information is not required for safe operation of the aircraft. However, certifying changes to the flight deck network for such non-essential information, as required by current systems and methods, may incur a higher level of engineering effort. In some cases, such information may be used on the flight deck on dedicated auxiliary systems that are separated from the flight deck network. The different illustrative embodiments recognize and take into account that it would be desirable to use such non-essential but useful information on the flight deck network itself.

The different illustrative embodiments recognize and take into account that information from various sources may be available on an aircraft or accessible by the aircraft during operation of the aircraft. Such information may include information that is non-essential for safe operation of the aircraft but which would be useful for operation of the aircraft if such information were available to the flight crew on the flight deck. For example, such information, if made available to the flight crew during operation of the aircraft, might be used by the flight crew to improve aircraft operating efficiency, to enhance the experience of aircraft passengers during a flight, or for some other useful purpose.

Potentially useful information may include operationally approved information or information that has been subjected to a lower level certification process than may be used to certify information that is allowed to be part of the aircraft flight deck network. In some cases, such potentially useful information may include new information products, information products from new information sources, or new information formats. New or changed information products, sources, or formats may become available so frequently that certification of the latest versions of potentially useful information for use as part of a certified flight deck network is not possible or practical. In other words, information that may be potentially useful if made available to a flight crew during an aircraft operation may be information that is not certified at the higher level required for information that is part of the flight deck network.

The different illustrative embodiments also recognize and take into account that it is desirable that any information used on an aircraft flight deck is handled so that the use of such information on the flight deck does not interfere with safe operation of the aircraft. In particular, the different illustrative embodiments recognize and take into account that it is desirable that any useful but non-essential information on the flight deck network should not affect the use by the flight crew of essential information that is required for safe operation of the aircraft in any undesired manner.

Thus, one or more of the illustrative embodiments provides a system and method for handling information that is used by a flight crew on an aircraft flight deck. In accordance with an illustrative embodiment, information to be used on an aircraft flight deck is handled so that both essential information, that may be required for safe operation of the aircraft, and potentially useful but non-essential information may be used together by the flight crew during operation of the aircraft on a certified flight deck network. The useful but non-essential information to be used on the flight deck may be obtained from various information sources, including information sources on the aircraft or off the aircraft and information sources that may be accessible by the aircraft when in operation. Non-essential information may be handled such that useful information may be made available on the flight deck network along with essential information required for safe operation of the aircraft in a manner that does not affect safe operation of the aircraft in any undesired way.

In accordance with an illustrative embodiment, potentially useful but non-essential information is approved for use on the flight deck before the non-essential information is sent to the flight deck. The approval process may be a flexible process that is less time consuming and less costly than the process for certifying a change to the flight deck network if the information were to be certified as part of the flight deck network. Therefore, in accordance with an illustrative embodiment, information products, sources of information, and information formats that are approved may be changed more easily over the course of time after an aircraft enters into service. The manner in which such non-essential information is allowed to be used on the flight deck may be determined and controlled so that the use of non-essential information on the flight deck does not interfere with the use by the flight crew of essential information on the flight deck. Therefore, the flight crew is able to operate the aircraft safely and in an improved manner.

One or more of the illustrative embodiments provides an information controller for handling the information that is provided to a flight deck network. Potentially useful information from various sources on-board the aircraft, or that are accessible by the aircraft when in operation, may be provided to the information controller.

The information controller may determine whether any such potentially useful information is approved for use by the flight crew on the flight deck network and may check the integrity of any such approved information. The information controller only passes information that is approved and that has passed an integrity check to the flight deck network. The information controller also may determine the manner in which such information is allowed to be used on the flight deck network. The information controller may tag the information that is provided to the flight deck with tags indicating how that information is allowed to be used on the flight deck. The flight deck network may then control the manner in which the information is used on the flight deck based on the allowed uses indicated by the tags.

Turning now to FIG. 1, an illustration of a block diagram of a system for handling information for use on an aircraft flight deck is depicted in accordance with an illustrative embodiment. In this illustrative example, flight deck 100 may be a flight deck on aircraft 102. Flight deck 100 also may be referred to as the cockpit of aircraft 102. Flight deck 100 may include various controls which enable flight crew 104 to control the operation of aircraft 102. For example, without limitation, flight deck 100 may include an area located near the front of aircraft 102. In another example, without limitation, flight crew 104 may include a pilot, a copilot, a navigator, other personnel, or various combinations of personnel for controlling the operation of aircraft 102.

Flight deck 100 may include displays 106. Displays 106 may be a number of displays in this illustrative example. Displays 106 may include any number of devices or systems for displaying various types of information for use by flight crew 104. In accordance with an illustrative embodiment, the information that is displayed to flight crew 104 on displays 106 may include both information that is required for safe operation of aircraft 102 by flight crew 104 and other information. The information displayed to flight crew 104 is controlled so that the display of such information may enhance the operation of aircraft 102 without affecting the safe operation of aircraft 102 in any undesired manner.

The location of flight deck 100 on aircraft 102, the composition of flight crew 104, the number and types of devices and systems used to implement displays 106, and the types of information displayed to flight crew 104 may depend on various factors including, for example, without limitation, the type of aircraft 102, the operations to be performed by aircraft 102, specific flight or mission requirements, or other factors or various combinations of factors. Aircraft 102 may be any type of aircraft. For example, without limitation, aircraft 102 may include a fixed wing, rotary wing, or lighter than air aircraft. Aircraft 102 may be configured for carrying passengers, cargo, both passengers and cargo, or may be used for performing any other operation or mission. Aircraft 102 may be operated by an airline, a military unit, or any other private or governmental entity.

Aircraft 102 is an example of vehicle 108 in which illustrative embodiments may be implemented. Information handling, in accordance with an illustrative embodiment, may be implemented in types of vehicles other than aircraft 102. For example, without limitation, vehicle 108 may be any vehicle that is configured for travelling through the air, in space, on land, on the surface of water, underwater, or in any other operating environment or combination of environments.

Vehicle 108 is an example of platform 110 in which illustrative embodiments may be implemented. Information handling, in accordance with an illustrative embodiment, may be implemented in types of platforms other than vehicle 108. For example, platform 110 may include any fixed or movable structure that may be controlled by an operator using information that is displayed to the operator on one or more display devices.

In cases where illustrative embodiments are implemented on vehicles or platforms other than aircraft 102, displays 106 may be provided in one or more areas or locations on vehicle 108 or platform 110 where functions corresponding to the functions performed on flight deck 100 for aircraft 102 are performed for vehicle 108 or platform 110. For example, without limitation, displays 106 may be provided in a control room or one or more other locations or combinations of locations on vehicle 108 or platform 110 from which a human operator may control operation of vehicle 108 or platform 110 using the information displayed. In other words, illustrative embodiments may be used for handling information that is used in an area of vehicle 108 or platform 110 to perform operations similar to those performed on flight deck 100, even though such an area may not be referred to as a flight deck or a cockpit.

Continuing with the example of aircraft 102, displays 106 may be provided as part of information display system 112 on flight deck 100. Information display system 112 also may include crew interfaces 114. Crew interfaces 114 are configured to receive input for information display system 112 from flight crew 104. For example, without limitation, crew interfaces 114 may be configured to receive input from flight crew 104 for selecting or changing the information displayed, for selecting or changing the manner in which information is displayed, or for otherwise controlling the operation of information display system 112 in any other manner.

Crew interfaces 114 may be implemented using a number of devices or systems that are separate from displays 106, that are included as part of displays 106, or both. For example, without limitation, one or more of displays 106 may be implemented as touch screen display devices. In this example, the touch screen display devices operate as both displays 106 for displaying information to flight crew 104 and crew interfaces 114 for receiving instructions for controlling the operation of information display system 112 from flight crew 104.

The functions performed by information display system 112 may be implemented in hardware or software operating in combination with hardware. For example, without limitation, a number of functions performed by information display system 112 may be implemented in software running on one or more data processing systems.

Information display system 112, along with other data processing systems or other systems or devices, may be part of flight deck network 116. Flight deck network 116 may be implemented in any appropriate manner to provide for the communication of information between the various parts of flight deck network 116. For example, without limitation, flight deck network 116 may be implemented as a local area network or another type of network using any appropriate network configuration. Flight deck network 116 is associated with flight deck 100. In accordance with an illustrative embodiment, the parts of flight deck network 116 may include data processing systems, other systems and devices, and software and other information used for implementing information display system 112 and other functions to be performed on flight deck 100.

All of the parts of flight deck network 116 may be physically located on or adjacent to flight deck 100 on aircraft 102. Alternatively, some of the parts of flight deck network 116 may be remotely located from flight deck 100. In any case, the various parts of flight deck network 116 may be connected to flight deck network 116 via appropriate wired, optical, wireless, or other connections or combinations of connections. The various parts of flight deck network 116 and the various connections between those parts may be secured using known techniques to prevent unauthorized physical or other access to flight deck network 116. For purposes of the present application, including in the claims, flight deck network 116, including displays 106 on flight deck 100, may be referred to as being "on" flight deck 100, "for" flight deck 100, or other similar terms even though some parts of flight deck network 116 may be located remotely from flight deck 100.

Flight deck network 116 is an example of higher level certified network 117. Higher level certified network 117 is a network wherein all of the parts of the network, including hardware, software, and information to be displayed on higher level certified network 117, is required to pass a relatively high level certification process. In accordance with an illustrative embodiment, as will be described in more detail below, systems that are certified at a lower level of certification may connect to flight deck network 116, and non-essential information may be displayed on flight deck network 116 at certain times and under certain controlled conditions. In the present application, including in the claims, such non-essential systems and information are not considered to be parts of flight deck network 116 or of higher level certified network 117.

Information display system 112 is configured to display essential information 118. Essential information 118 may include information that is required by flight crew 104 to operate aircraft 102 safely. Essential information 118 may be higher level certified information 120. Higher level certified information 120 is any information that has passed an appropriate relatively high level certification process. In some cases, higher level certified information 120 may include information other than essential information 118. In other words, information that is not necessarily required for operation of aircraft 102 by flight crew 104 may be passed through a relatively high level certification process to become part of higher level certified information 120.

In the present application, including in the claims, essential information 118 is considered to be a part of flight deck network 116 and, thus, a part of higher level certified network 117. Essential information 118 may include any information that is certified to be part of flight deck network 116. Essential information 118 may be displayed to flight crew 104 by information display system 112.

For example, without limitation, essential information 118 may be stored in a database that is part of flight deck network 116. Information display system 112 may access essential information 118 from such a database for displaying such information on flight deck network 116.

Appropriate procedures may be specified and followed for establishing and making any changes to higher level certified network 117 including loading essential information 118 onto flight deck network 116. The process for certifying higher level certified network 117 including essential information 118, the process for establishing and changing higher level certified network 117, including the process for loading essential information 118 onto flight deck network 116, and the security provided for the various parts of flight deck network 116 in combination provide appropriate controls for higher level certified network 117 and for essential information 118 that is displayed to flight crew 104. Such controls may ensure that essential information 118 that is required by flight crew 104 for safe operation of aircraft 102 is accurately displayed to flight crew 104 in a manner so that aircraft 102 is operated safely.

Aircraft 102 may include aircraft network data processing system 122. Aircraft network data processing system 122 may include a number of data processing systems and other devices for performing various functions on aircraft 102. Aircraft network data processing system 122 is separate from flight deck network 116. Information is not allowed to pass freely between flight deck network 116 and aircraft network data processing system 122. However, in accordance with an illustrative embodiment, information may be passed between flight deck network 116 and aircraft network data processing system 122 in a controlled manner.

In accordance with an illustrative embodiment, the flow of information between aircraft network data processing system 122 and flight deck network 116 may be controlled by information controller 124. In accordance with an illustrative embodiment, information controller 124 provides a single control point for the flow of information between aircraft network data processing system 122 and flight deck network

116 when aircraft 102 is in operation. Information controller 124 is configured to implement information handling functions 126. Information handling functions 126 control the flow of information between aircraft network data processing system 122 and flight deck network 116 in accordance with information handling rules 128. In accordance with an illustrative embodiment, information handling rules 128 may be defined in order to ensure that any information that is passed to flight deck network 116 from aircraft network data processing system 122 during aircraft operation may be used in a manner that does not affect the safe operation of aircraft 102 in any undesired manner.

As will be discussed in more detail below, information handling rules 128 may define information from aircraft network data processing system 122 that is approved for use on flight deck 100 as well as rules defining the manner in which such information is allowed to be used on flight deck network 116.

Information controller 124 may be configured to allow various types of non-essential information 130 to be provided to flight deck network 116 for use in a controlled manner. Non-essential information 130 may be any information that has not gone through a certification process to be approved to be a part of higher level certified network 117. Non-essential information 130 may include information that has gone through a process to determine that the information is approved for operational use on flight deck 100. For example, without limitation, non-essential information 130 may include lower level certified information 131 or operationally approved information 132. Non-essential information 130 may include any information that has gone through an approval process that is less time consuming, less expensive, or both less time consuming and less expensive than the certification process for essential information 118.

Non-essential information 130 may include useful information 134. Useful information 134 may include any information that may be useful to flight crew 104 for operating aircraft 102, but is not required for safe operation of aircraft 102. For example, without limitation, useful information 134 may include information that may improve the efficiency with which flight crew 104 operates aircraft 102, information that may improve the experience of passengers on aircraft 102 during a flight, or any other useful information, potentially useful information, or combinations of such information.

In some cases, useful information 134 may include information that is certified to be part of flight deck network 116. For example, useful information 134 may include information that has passed through a process for certifying the information for flight deck network 116 but that has not been loaded onto or otherwise made a part of flight deck network 116. In this case, such useful information 134 may be provided to flight deck network 116 via information controller 124 in the manner described herein.

Non-essential information 130 may include information that is provided to or obtained by information controller 124 before or during aircraft operation. For example, non-essential information 130 may include information that is provided to information controller 124 or that may be obtained by information controller 124 while aircraft 102 is in flight, before takeoff, or during any other state of operation of aircraft 102.

In the present application, including in the claims, "operation" of aircraft 102 refers generally to any state of operation of aircraft 102 in which flight crew 104 or similar operational personnel control operation of aircraft 102. Operation of aircraft 102 may be distinguished from other states of aircraft 102 when aircraft 102 is not in operation. For example, without limitation, aircraft 102 is not in operation when aircraft 102 is under construction or undergoing maintenance. Procedures may generally specify that parts of higher level certified network 117 on aircraft 102 may not be changed during operation of aircraft 102 as defined herein. For example, essential information 118 generally may not be loaded onto flight deck network 116 or otherwise made a part of flight deck network 116 during operation of aircraft 102 as defined herein.

Non-essential information 130 may be provided to or obtained by information controller 124 from on-board information sources 136, off-board information sources 138, or both. On-board information sources 136 may include any source for non-essential information 130 that is located onboard aircraft 102. For example, without limitation, on-board information sources 136 may include computers or other data processing devices that are located onboard aircraft 102 during operation of aircraft 102. Such computers or other data processing devices may be part of aircraft network data processing system 122 or separate from, but in communication with, aircraft network data processing system 122. Computers or other data processing devices located in the passenger cabin or cockpit of aircraft 102 are examples, without limitation, of on-board information sources 136. Off-board information sources 138 may include any sources for non-essential information 130 that are not located on aircraft 102 but that may be in communication with aircraft network data processing system 122 during operation of aircraft 102.

Non-essential information 130 may be transferred from on-board information sources 136, off-board information sources 138, or both, to information controller 124 via information transfer systems 140. Similarly, information controller 124 may request non-essential information 130 from on-board information sources 136, off-board information sources 138, or both, via information transfer systems 140. Information transfer systems 140 may include hardware or software running on hardware that is configured to provide for information transfer and other communications between on-board information sources 136, off-board information sources 138, and information controller 124.

Specific implementations of information transfer systems 140 for any specific application may depend upon the specific implementations of on-board information sources 136 and off-board information sources 138 for that application, the types of information provided by such information sources, protocols that may be required for transferring information from such information sources, or other factors or combinations of factors that may be relevant for any particular application.

For example, without limitation, information transfer systems 140 may include appropriate hardware, or hardware and software, for wired transfer 142 or for wireless transfer 144 of non-essential information 130 to information controller 124. For example, wired transfer 142 may include the transfer of non-essential information 130 via electrical or optical conductors or other similar conduction media or combinations of media. Wireless transfer 144 may be provided via appropriate transmission frequencies and using appropriate wireless information transfer protocols.

As another example, information transfer systems 140 may include hardware, or hardware and software, configured to provide hardware transfer 146 of non-essential information 130 to information controller 124. Hardware transfer 146 may include connecting a hardware device or other tangible computer readable media containing non-essential information 130 to aircraft network data processing system 122 and transferring non-essential information 130 from the hardware device or other media to information controller 124. For example, without limitation, hardware transfer 146 may include physically connecting a portable hardware memory device or other portable computer readable media to aircraft network data processing system 122.

As another example, information transfer systems 140 may include hardware, or hardware and software, configured for manual entry 148 of non-essential information 130 to information controller 124. For example, without limitation, manual entry 148 may include manual entry of non-essential information 130 using a keyboard, keypad, touch screen, or other such device or combinations of devices for manually entering information into a data processing system.

In accordance with an illustrative embodiment, non-essential information 130 from on-board information sources 136, off-board information sources 138, or both, may be provided to information controller 124 automatically on a periodic or irregular basis, or both. Alternatively or additionally, non-essential information 130 may be retrieved by information controller 124 from on-board information sources 136, off-board information sources 138, or both, on a periodic or irregular basis, or both.

Non-essential information 130 that may be used on flight deck 100 may be obtained by information controller 124 before a request for such information is received by information controller 124 from flight deck network 116. In this case, information controller 124 may process such information as it is received using information handling functions 126 and information handling rules 128.

Non-essential information 130 processed in this manner may then be stored by information controller 124 on aircraft network data processing system 122. For example, information controller 124 may store such processed information in one or more databases implemented in one or more storage devices provided as part of aircraft network data processing system 122 or accessible by aircraft network data processing system 122. Storing non-essential information 130 that is processed by information controller 124 in this manner allows information controller 124 to respond more rapidly when a request for such information is received from flight deck 100.

In accordance with an illustrative embodiment, non-essential information 130 may be provided to flight deck network 116 in response to a request for such information from flight deck network 116. Preferably, non-essential information 130 is not pushed or otherwise transferred to higher level certified network 117 unless a request for such information is received from higher level certified network 117. For example, without limitation, flight crew 104 may employ crew interfaces 114 to initiate a request for non-essential information 130 that is not part of higher level certified network 117. The request may be sent from information display system 112 to information controller 124. Information controller 124 may respond to such a request by providing non-essential information 130 that has already been processed and stored by information controller 124 to flight deck network 116 if non-essential information 130 that is requested has already been processed and stored and is available on aircraft network data processing system 122.

Alternatively, information controller 124 may respond to a request for non-essential information 130 from flight deck network 116 by attempting to locate and retrieve non-essential information 130 that has been requested from on-board information sources 136, off-board information sources 138, or both. In this case, if the requested information is obtained by information controller 124, information controller 124 processes the information using information handling functions 126 and information handling rules 128 before providing non-essential information 130 that has been requested to flight deck network 116.

In any case, non-essential information 130 that is provided by information controller 124 to flight deck network 116 in response to a request may be displayed to flight crew 104 by information display system 112. Thus, in accordance with an illustrative embodiment, essential information 118 and non-essential information 130 may be displayed together on higher level certified network 117 during operation of aircraft 102.

As will be discussed in more detail below, information display system 112 may be configured to control the display of non-essential information 130 in an allowed manner. The manner in which non-essential information 130 may be used on flight deck network 116 may be defined by information handling rules 128 as applied to non-essential information 130 by information handling functions 126 before non-essential information 130 is provided to flight deck network 116.

Figure 2:
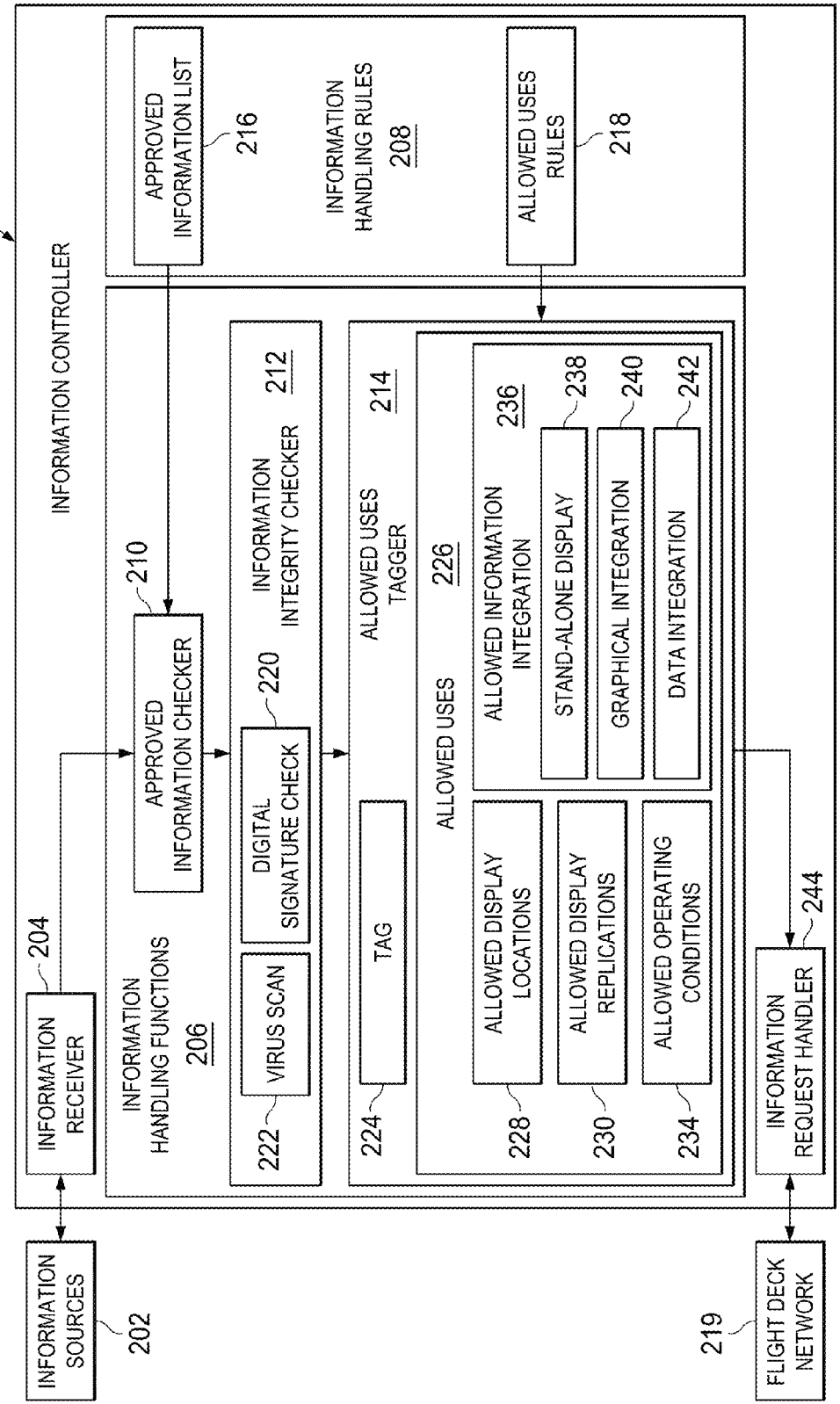
FIG. 2 is an illustration of a block diagram of an information controller in accordance with an illustrative embodiment.

Turning now to FIG. 2, an illustration of a block diagram of an information controller is depicted in accordance with an illustrative embodiment. In this example, information controller 200 is an example of one implementation of information controller 124 in FIG. 1.

Information controller 200 may obtain information from information sources 202. Information sources 202 include sources of information that are not part of flight deck network 219 of an aircraft. Information sources 202 may include sources of information that are not certified for being part of flight deck network 219. However, information that may be obtained from information sources 202 may include information that may be useful for operating an aircraft if such information is available for use on flight deck network 219. Information sources 202 may include, for example, without limitation, on-board information sources 136 and off-board information sources 138 in FIG. 1.

Information controller 200 includes information receiver 204. Information receiver 204 is configured to receive information from information sources 202. Information received by information receiver 204 is processed by information controller 200 using information handling functions 206 and information handling rules 208. In accordance with an illustrative embodiment, information handling functions 206 are implemented by approved information checker 210, information integrity checker 212, and allowed uses tagger 214. Information handling rules 208 may include approved information list 216 and allowed uses rules 218.

Approved information checker 210 determines whether information obtained by information controller 200 from information sources 202 is a type of information that is allowed to be sent to and displayed on flight deck network 219. Approved information may be defined by approved information list 216. Thus, approved information checker 210 may determine whether information received by information controller 200 is approved information using approved information list 216. Approved information list 216 may be stored in whole or in part in a database or other data structure that is part of information controller 200. Alternatively, approved information list 216 may be stored in any other form or location where approved information list 216 may be accessed by approved information checker 210.

Approved information list 216 may identify a number of criteria for determining whether information received by information controller 200 is allowed to be sent to and displayed on flight deck network 219. For example, without limitation, such criteria may identify approved types of information, approved sources of information, approved information formats, approved standards classifications, or other criteria or combinations of criteria for identifying approved information. The process for identifying approved information may be less time consuming and expensive than the process for certifying information to be part of flight deck network 219. Information that is approved by approved information checker 210 may include lower level certified information and operationally approved information.

Information that is identified as approved information by approved information checker 210 may then be processed by information integrity checker 212. Information integrity checker 212 is configured to determine whether or not any information received from information sources 202 may be corrupted. Even approved types of information from approved sources may become corrupted before such information is received by information controller 200. For example, without limitation, such information may become corrupted during transmission from information sources 202 to information controller 200. It may not be safe to send such corrupted information to flight deck network 219.

Information integrity checker 212 may employ a number of processes for determining whether or not information from information sources 202 may be corrupted. For example, without limitation, information integrity checker 212 may perform digital signature check 220. Digital signature check 220 may include checking a digital signature provided with the information to verify that that information is from a known source. As another example, information integrity checker 212 may perform virus scan 222 to verify that the information is clean of any undesired computer viruses or other undesired computer executable code.

Information that is identified as approved information by approved information checker 210 and passed by information integrity checker 212 may be processed by allowed uses tagger 214. Allowed uses tagger 214 identifies how approved information is allowed to be used on flight deck network 219. Stated in another way, allowed uses tagger 214 may identify limitations on the manner in which approved information may be used on flight deck network 219. The manner in which approved information is allowed to be used on flight deck network 219 may be defined by allowed uses rules 218. Thus, allowed uses tagger 214 may use allowed uses rules 218 to identify the manner in which approved information is allowed to be used on flight deck network 219. Allowed uses rules 218 may be stored in whole or in part in a database or other data structure that is part of information controller 200. Alternatively, allowed uses rules 218 may be stored in any other form or location where allowed uses rules 218 may be accessed by allowed uses tagger 214.

Allowed uses rules 218 may be established to define the manner in which approved information is allowed to be used on flight deck network 219 based on a number of factors. For example, without limitation, such factors may include the desired degree of interaction with the information by the flight crew, desired ease of viewing the information by the flight crew, flight crew resource management, or other factors or combinations of factors. Another factor may include displaying non-essential information on flight deck network 219 in a manner that does not interfere with the displaying of information that is required for safe operation of the aircraft and does not distract the flight crew from using such required information. In accordance with an illustrative embodiment, different allowed uses rules 218 may be provided for different types of approved information. Different allowed uses rules 218 for different types of information may be established based on different factors of interest or concern.

Allowed uses tagger 214 may associate tag 224 with information processed by allowed uses tagger 214. Tag 224 may be data in any form that is attached to or otherwise associated with information to indicate allowed uses 226 for the information. Allowed uses 226 for information are identified by allowed uses tagger 214 using allowed uses rules 218.

Allowed uses 226 define the manner in which information is allowed to be used on flight deck network 219. For example, without limitation, allowed uses 226 may include allowed display locations 228, allowed display replications 230, allowed operating conditions 234, allowed information integration 236, or other definitions or combinations of a number of definitions of the manner in which information is allowed to be used on flight deck network 219.

Allowed display locations 228 may identify locations on the flight deck at which the information is allowed to be displayed. For example, without limitation, allowed display locations 228 may identify display devices on the flight deck on which the information is allowed to be displayed, portions of individual display devices on which the information is allowed to be displayed, the size of an area on a display device that may be used for displaying the information, or any other indication or combination of indications for identifying locations on the flight deck at which the information is allowed to be displayed. Allowed display replications 230 may indicate a number of locations on the flight deck at which information may be displayed simultaneously.

Allowed operating conditions 234 may indicate operating conditions of an aircraft during which the information is allowed to be displayed on the flight deck or is not allowed to be displayed on the flight deck. For example, without limitation, allowed operating conditions 234 may indicate that the information is allowed to be displayed on the flight deck only at certain times during operation of the aircraft, such as during certain phases of flight, or under other defined operating conditions or combinations of conditions.

Allowed information integration 236 identifies the degree to which the information provided by information controller 200 to flight deck network 219 may be integrated with essential information on flight deck network 219. For example, without limitation, allowed information integration 236 at the level of stand-alone display 238 indicates that the information provided by information controller 200 may be displayed on the flight deck as separate video or other displays that are not integrated in any way with the display of essential information that is part of flight deck network 219. Allowed information integration 236 at the level of graphical integration 240 indicates that the display of information from information controller 200 may be overlaid, under-laid, or otherwise combined at the graphical level with the display of essential information that is part of flight deck network 219. Allowed information integration 236 at the level of data integration 242 indicates that the information provided by information controller 200 may be combined with essential information that is part of flight deck network 219 before using the combined information on flight deck network 219. In this case, the information provided by information controller 200 may be used to modify the essential information, or vice versa, before the information is used on flight deck network 219. For example, without limitation, using the combined information on flight deck network 219 may include generating a display from the combined information.

Information controller 200 also may include information request handler 244. Information request handler 244 may be configured to receive a request for information from flight deck network 219. Information request handler 244 may be configured to determine whether the requested information is available to or otherwise may be obtained by information controller 200. Information request handler 244 may be configured to provide requested information from information controller 200 to flight deck network 219 in response to a request. For example, requested information that is approved by approved information checker 210 and that passes the checks performed by information integrity checker 212 may be provided along with an associated tag 224 to flight deck network 219 by information request handler 244.

Information request handler 244 also may be configured to send a request denial message to flight deck network 219 if a received request for information cannot be satisfied by information controller 200. For example, without limitation, a received request for information may not be satisfied by information controller 200 if the requested information is not available to or cannot be obtained by information controller 200, if the requested information is not approved by approved information checker 210, if the requested information does not pass a check performed by information integrity checker 212, or for some other reason or combination of reasons. The request denial message may or may not indicate why the request for information is denied by information controller 200.

Information sent to flight deck network 219 by information request handler 244 may be used on flight deck network 219 in the manner in which the information is allowed to be used as indicated by the associated tag 224. For example, the information may be displayed on the flight deck along with the display of essential information that is part of flight deck network 219.

The illustrations of FIG. 1 and FIG. 2 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, in accordance with an illustrative embodiment, information controller 124 may be used to control both the flow of information from aircraft network data processing system 122 to flight deck network 116 and the flow of information from flight deck network 116 to aircraft network data processing system 122. Functions and criteria similar to or different from those described above may be employed by information controller 124 to control the flow of information from flight deck network 116 to aircraft network data processing system 122.

A number of the functions of information controller 124 or information controller 200, as described above, may be performed in whole or in part by a data processing system that is part of aircraft network data processing system 122, that is not part of flight deck network 116, or by a data processing system that is part of flight deck network 116. For example, without limitation, a number of the functions of approved information checker 210 may be performed on flight deck network 116. For example, it may be determined by an appropriate function on flight deck network 116 that certain information requested by flight crew 104 via crew interfaces 114 is not approved information. In this case, the request for such information may not be sent from flight deck network 116 to information controller 124 that is not part of flight deck network 116.

The handling of information in accordance with an illustrative embodiment may include the presentation of information on flight deck network 116 in audible form. In this case, the information may be presented on speakers that are part of flight deck network 116.

Figure 3:
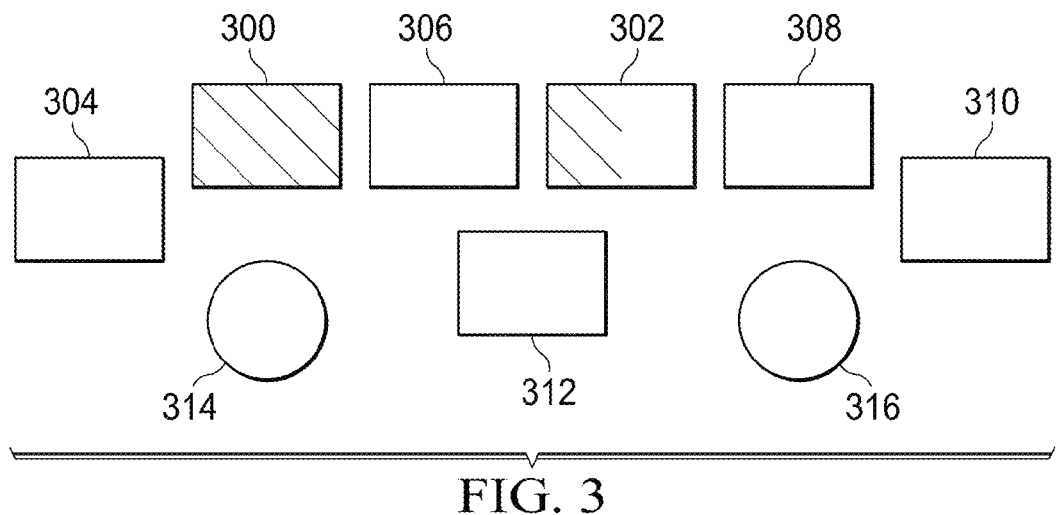
FIG. 3 is an illustration of an arrangement of displays on an aircraft flight deck showing allowed locations for displaying information in accordance with an illustrative embodiment.

Turning now to FIG. 3, an illustration of an arrangement of displays on an aircraft flight deck showing allowed locations for displaying information is depicted in accordance with an illustrative embodiment. In this example, displays 300, 302, 304, 306, 308, 310, and 312 are examples of displays 106 in FIG. 1. Circles 314 and 316 indicate example positions of flight crew members with respect to displays 300, 302, 304, 306, 308, 310, and 312.

In this example, hash marks in display 300 and display 302 indicate that particular information is allowed to be displayed anywhere in display 300 or in the left half of display 302. These allowed locations for displaying the information may be indicated by a tag or other data that is attached to or otherwise associated with the information.

Figure 4:
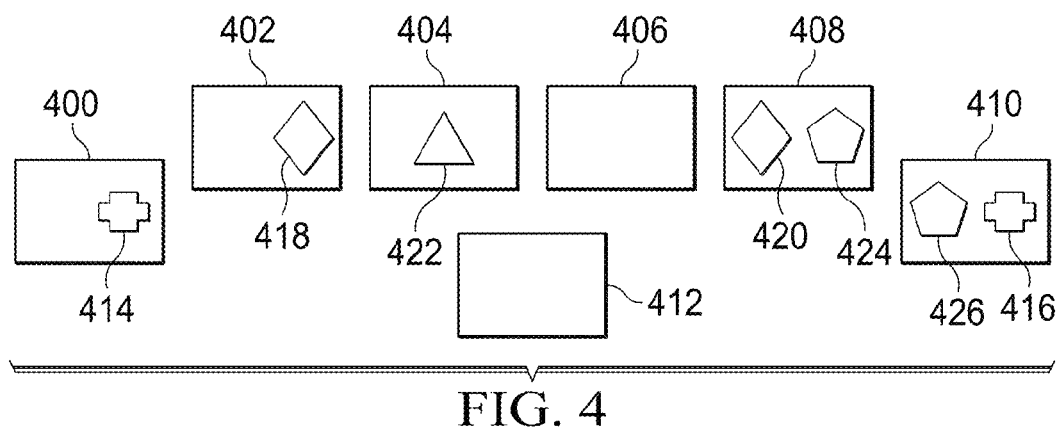
FIG. 4 is an illustration of an arrangement of displays on an aircraft flight deck showing allowed replications of displayed information in accordance with an illustrative embodiment.

Turning now to FIG. 4, an illustration of an arrangement of displays on an aircraft flight deck showing allowed replications of displayed information is depicted in accordance with an illustrative embodiment. In this example, displays 400, 402, 404, 406, 408, 410, and 412 are examples of displays 106 in FIG. 1.

In this example, cross symbols 414 and 416 indicate that one type of information may be displayed in up to two replications on displays 400 and 410. Diamond symbols 418 and 420 indicate that another type of information may be allowed to be displayed in up to two replications on displays 402 and 408. Triangle symbol 422 indicates a third type of information that may be allowed to be displayed in only one replication on display 404. Pentagon symbols 424 and 426 indicate that a fourth type of information may be allowed to be displayed in up to two replications on displays 408 and 410. These allowed replications for the display of various types of information may be indicated by a tag or other data that is attached to or otherwise associated with the information.

Figure 5:
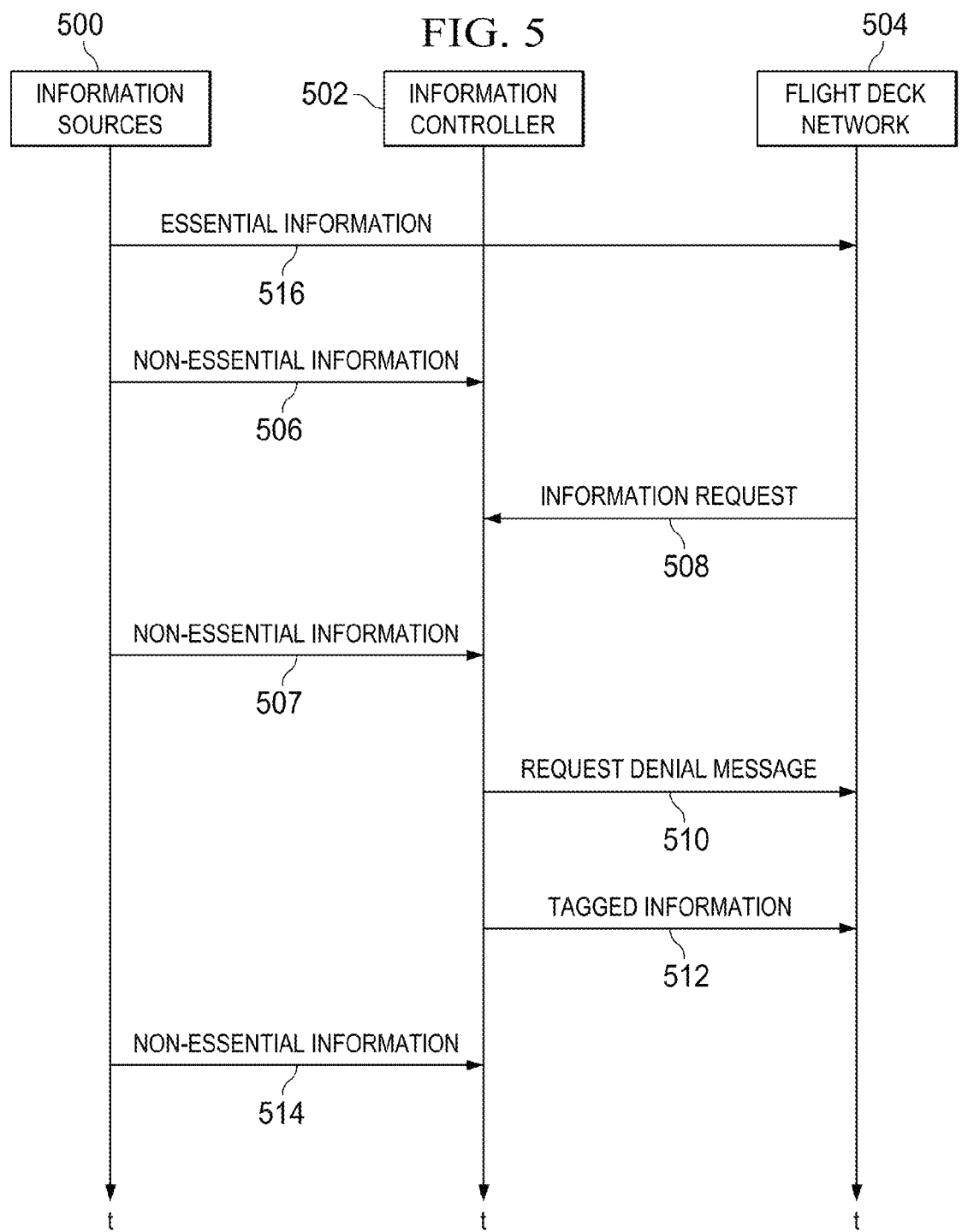
FIG. 5 is an illustration of information transfers for information to be used on an aircraft flight deck in accordance with an illustrative embodiment.

Turning now to FIG. 5, an illustration of information transfers for information to be used on an aircraft flight deck is depicted in accordance with an illustrative embodiment. In this example, an example of the flow of information between information sources 500, information controller 502, and flight deck network 504 is depicted. In this example, information sources 500 is an example of information sources 202 in FIG. 2, information controller 502 is an example of information controller 200 in FIG. 2, and flight deck network 504 is an example of flight deck network 219 in FIG. 2.

Non-essential information 506, 507, and 514 may be transferred from information sources 500 to information controller 502 at various times. Information request 508 may be received by information controller 502 from flight deck network 504. In response to receiving information request 508, information controller 502 may send request denial message 510 to flight deck network 504 if the requested information cannot be provided by information controller 502. Request denial message 510 may or may not indicate why the request for information is being denied.

If the requested information can be provided, information controller 502 may send tagged information 512 to flight deck network 504 in response to information request 508. Tagged information 512 may include non-essential information 506 that is received by information controller 502 before information request 508 or non-essential information 507 that is received by information controller 502 after information request 508. For example, tagged information 512 may include non-essential information 507 that is obtained by information controller 502 from information sources 500 in response to information request 508. Thus, non-essential information 506, 507, and 514 may be provided from information sources 500 to information controller 502 independently of the receipt of information request 508 by information controller 502 from flight deck network 504. In any case, tagged information 512 may be tagged by information controller 502 with data indicating the manner in which the information may be used on flight deck network 504.

Essential information 516 includes information that is certified to be part of flight deck network 504. Essential information 516 may be provided from information sources 500 to flight deck network 504 without passing through information controller 502. For example, essential information 516 may be loaded on flight deck network 504 using appropriate procedures for making changes to flight deck network 504. Tagged information 512 and essential information 516 may be used together on flight deck network 504.

Figure 6:
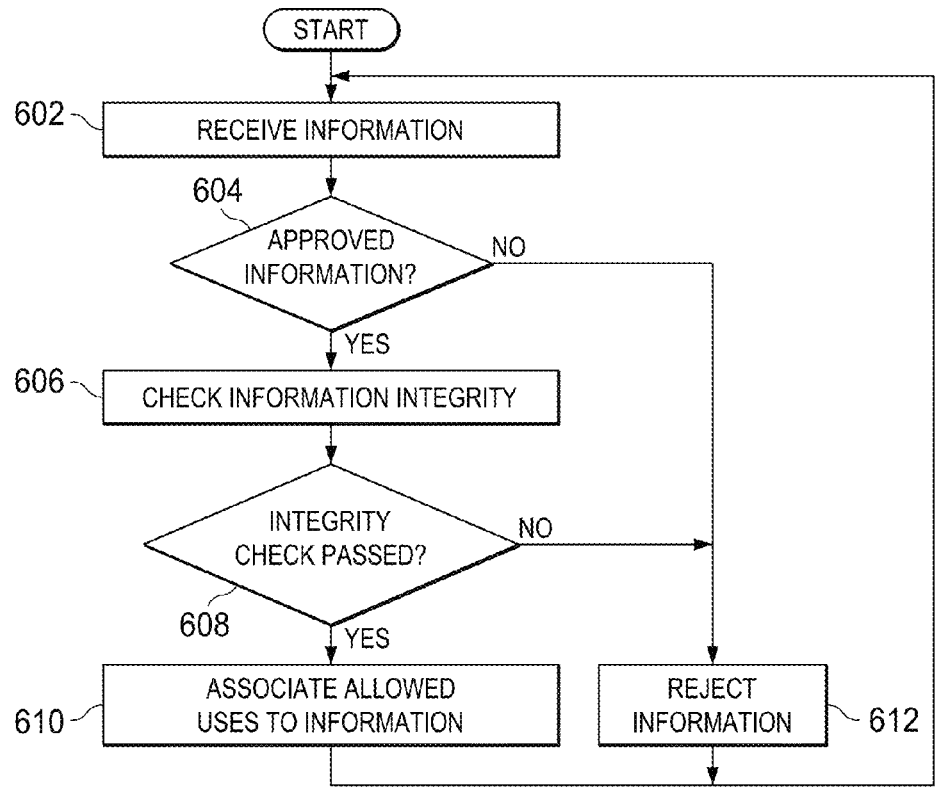
FIG. 6 is an illustration of a flowchart of a process for handling information received by an information controller in accordance with an illustrative embodiment.

Turning now to FIG. 6, an illustration of a flowchart of a process for handling information received by an information controller is depicted in accordance with an illustrative embodiment. The process illustrated may be implemented, for example, in information controller 124 in FIG. 1 or information controller 200 in FIG. 2.

The process begins by receiving information from a variety of information sources (operation 602). The variety of information sources includes information sources that are not part of a higher level certified network. The process determines whether the received information is approved information (operation 604). Approved information includes information that is approved to be displayed on the higher level certified network. If it is determined that the received information is approved information, the process then checks the integrity of the information (operation 606). Operation 606 may include, for example, without limitation, checking a digital signature associated with the information, scanning the information for viruses, or performing other integrity checks or combinations of integrity checks. It then may be determined whether the integrity check is passed (operation 608). If the integrity check is passed, allowed uses may be associated with the information (operation 610). For example, operation 610 may include attaching or otherwise associating tags to the information that include data for indicating the manner in which the information is allowed to be used on the higher level certified network. After operation 610 the process may be repeated starting at operation 602 with the receiving of further information from the information sources.

If it is determined at operation 604 that the information is not approved, or if it is determined at operation 608 that the information integrity check is not passed, the received information is rejected (operation 612). If the information is rejected, the information may not be sent to the higher level certified network. After operation 612, the process may be repeated starting at operation 602 with the receiving of further information from the information sources. The process illustrated in FIG. 6 may be performed each time information is received by an information controller.

Figure 7:
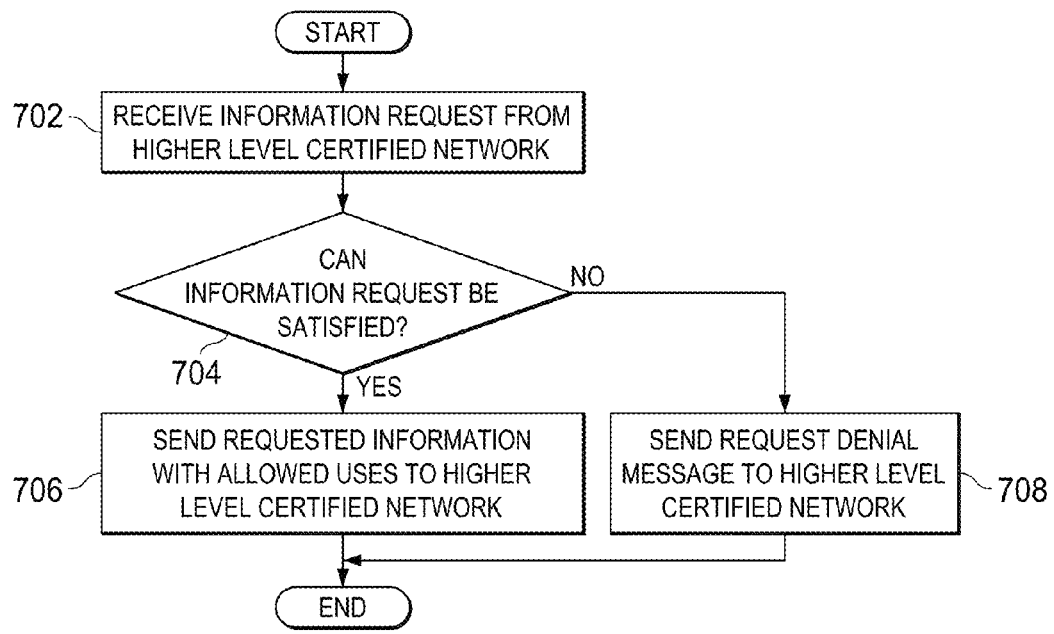
FIG. 7 is an illustration of a flowchart of a process for responding to a request for information by an information controller in accordance with an illustrative embodiment.

Turning now to FIG. 7, an illustration of a flowchart of a process for responding to a request for information by an information controller is depicted in accordance with an illustrative embodiment. The process illustrated in FIG. 7 may be performed by information controller 124 in FIG. 1 or information controller 200 in FIG. 2.

The process begins by receiving an information request from a higher level certified network (operation 702). For example, the higher level certified network may be a flight deck network on an aircraft. The information controller may then determine whether the information request can be satisfied (operation 704). If the information request can be satisfied, the requested information with allowed uses may be sent to the higher level certified network (operation 706), with the process terminating thereafter. The allowed uses may include data associated with the information sent to the higher level certified network that indicates the manner in which the information may be used on the higher level certified network.

If it is determined that the information request cannot be satisfied, a request denial message may be sent back to the higher level certified network (operation 708), with the process terminating thereafter. The request denial message may or may not indicate why the request for information is denied.

Figure 8:
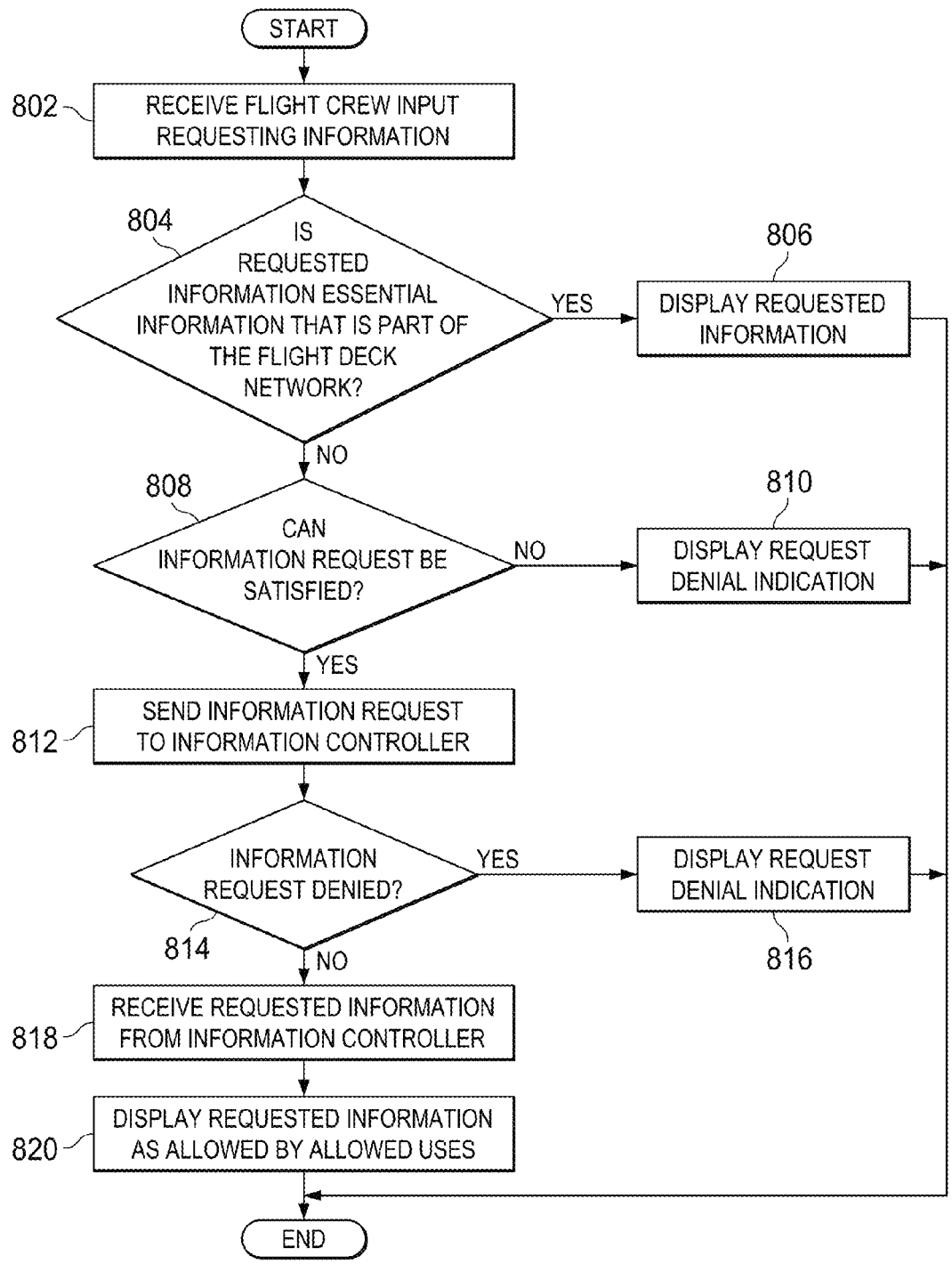
FIG. 8 is an illustration of a flowchart of a process for handling information by an information display system on an aircraft flight deck in accordance with an illustrative embodiment.

Turning now to FIG. 8, an illustration of a flowchart of a process for handling information by an information display system on an aircraft flight deck is depicted in accordance with an illustrative embodiment. In this example, the process illustrated in FIG. 8 may be performed by information display system 112 in FIG. 1.

The process begins by an information display system receiving flight crew input requesting the display of certain information on the flight deck (operation 802). It may be determined whether the information requested is essential information that is part of the flight deck network (operation 804). If it is determined that the requested information is essential information that is part of the flight deck network, the requested information may be displayed on the flight deck (operation 806), with the process terminating thereafter.

If it is determined that the requested information is not essential information that is part of the flight deck network, it may be determined whether the information request can be satisfied (operation 808). If it is determined that the information request cannot be satisfied, a request denial indication may be displayed to the flight crew (operation 810), with the process terminating thereafter. For example, it may be determined that the information request cannot be satisfied if the information requested is not information that is approved to be displayed on the flight deck network.

If it is determined that the information request can be satisfied, the information request may be sent to an information controller (operation 812). It may then be determined whether the information request is denied by the information controller (operation 814). If the information request is denied, a request denial indication may be displayed to the flight crew on the flight deck (operation 816), with the process terminating thereafter.

If it is determined that the information request is not denied, the requested information may be received from the information controller (operation 818). The information received from the information controller may then be displayed on the flight deck in a manner as indicated by allowed uses for the information (operation 820), with the process terminating thereafter. The allowed uses for the information may be indicated by data that is attached to or otherwise associated with the information from the information controller.

Figure 9:
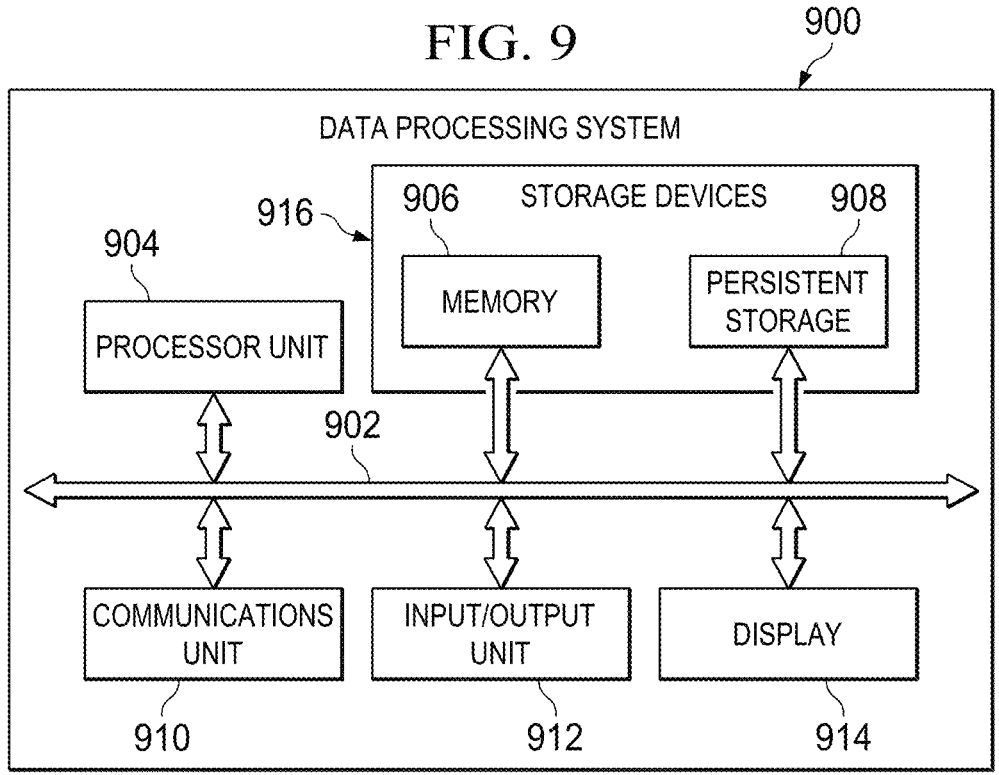
FIG. 9 is an illustration of a data processing system in accordance with an illustrative embodiment.
Figure 9:
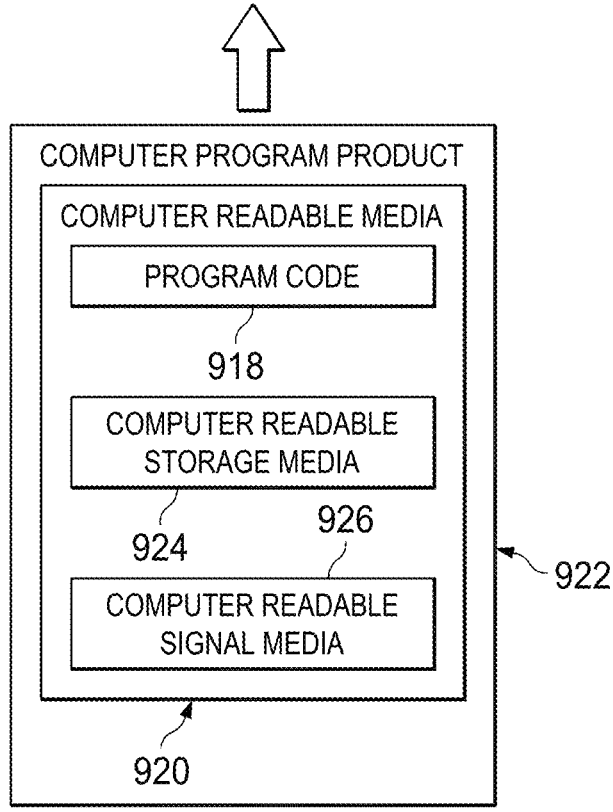

Turning now to FIG. 9, an illustration of a data processing system is depicted in accordance with an illustrative embodiment. In this example, data processing system 900 is an example of one implementation of a data processing system for implementing information display system 112 or information controller 124 in FIG. 1.

In this illustrative example, data processing system 900 includes communications fabric 902. Communications fabric 902 provides communications between processor unit 904, memory 906, persistent storage 908, communications unit 910, input/output (I/O) unit 912, and display 914. Memory 906, persistent storage 908, communications unit 910, input/ output (I/O) unit 912, and display 914 are examples of resources accessible by processor unit 904 via communications fabric 902.

Processor unit 904 serves to run instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and other suitable information either on a temporary basis or a permanent basis. Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code. As one example, data processing system 900 may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as found in an interface and memory controller hub that may be present in communications fabric 902.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for handling information for use on a certified flight deck network, the certified flight deck network forming a closed system requiring: separation of essential information from data processing systems other than the certified flight deck network, and a certification from a regulatory authority, the essential information comprising information required for a safe operation of a flight of an aircraft, the method comprising:

receiving non-essential information from a number of information sources other than the certified flight deck network, non-essential information being information coming from a data processing system other than the certified flight deck network and usable on the certified flight deck without interfering with the safe operation of the aircraft; wherein the non-essential information is not certified information determining whether the non-essential information passes an integrity check, and then allowing a use of the non-essential information on the certified flight deck network;

determining an allowed use of the non-essential information on the certified flight deck network; and responsive to determining the allowed use on the certified flight deck network, tagging the non-essential information with a tag indicating the allowed use, and sending the non-essential information to the certified flight deck network during operation of the aircraft denying transmission of non-essential information to the certified flight deck network until the integrity check is passed;

the number of information sources other than the certified flight deck network comprising information sources selected from: information sources on the aircraft, and information sources not o the aircraft; and the allowed use being a use that is free from interference with a use of the essential information on the certified flight deck network; and using the non-essential information in a manner that is free from interference with the use of the essential information on the certified flight deck network.

2. The method of claim 1, wherein the non-essential information comprises:

information selected from information that is operationally approved information; and useful information that is useful for the operation of the aircraft but is non-essential for safe operation of the aircraft.

3. The method of claim 1, wherein determining the allowed use comprises determining whether the non-essential information matches criteria provided in an approved information list, wherein the criteria are selected from a group of criteria consisting of: approved types of information, approved sources of information, approved information formats, and approved standards classifications.

4. The method of claim 1, wherein the allowed use comprises at least one of:

locations on the certified flight deck network allowing display of the non-essential information;

displaying a number of replications of the information simultaneously on the certified flight deck network;

a condition of operation of the aircraft during which the non-essential information displays on the certified flight deck network; and allowing integration of the non-essential information with information that is certified to be a part of the certified flight deck network.

5. The method of claim 1, further comprising selecting the allowed use from:

displaying a stand-alone display of the non-essential information separate from a display of essential information;

graphyically integrating the non-essntial information with the display of the essential information; and forming integrated information, via data integration of the non-essential information with the essential information before generating a display of the integrated information.

6. The method of claim 1 further comprising:
during the operation of the aircraft, an information controller receiving a request for the non-essential information from the certified flight deck network, and sending the non-essential information to the certified flight deck network in response to receiving the request.

7. The method of claim 6, wherein receiving the non-essential information comprises receiving the non-essential information in the information controller-before receiving the request for the non-essential information.

8. The method of claim 6, wherein receiving the non-essential information comprises obtaining the information from the number of information sources other than the certified flight deck network in response to receiving the request for the non-essential information from the certified flight deck network.

9. The method of claim 1, wherein sending the non-essential information comprises sending the non-essential information from the number of information sources other than the certified flight deck network to the certified flight deck network to be used on the certified flight deck network during the operation of the aircraft simultaneously with using other information that is a part of the certified flight deck network on the certified flight deck network.

10. The method of claim 9, wherein the other information that is a part of the certified flight deck network comprises information selected from: information certified to be a part of the certified flight deck network, and essential information.

11. A method for handling information on a flight deck network on an aircraft comprising:
during operation of the aircraft, sending a request from the flight deck network for non-essential information to be used on the flight deck network, the flight deck network forming a closed system requiring: separation of essential information from data processing systems other than the flight deck network, and a certification from a regulatory authority;
in response to the request, receiving non-essential information to be used on the flight deck network, the non-essential information comprising information coming from a source of information other than the flight deck network and usable on the flight deck without interfering with a safe operation of the aircraft; and
determining whether the non-essential information passes an integrity check, and then allowing a use of the non-essential information on the certified flight deck network;
determining an allowed use of the non-essential information on the certified flight deck network; responsive to determining the allowed use on the certified flight deck network, tagging the non-essential information with a tag indicating the allowed use, and sending the non-essential information to the certified flight deck network during operation of the aircraft; using the non-essential information on the flight deck network during the operation of the aircraft while simultaneously using other information that is a part of the flight deck network on the flight deck network denying transmission of non-essential information to the certified flight deck network until the integrity check is passed;
the number of information sources other than the certified flight deck network comprising information sources selected from: information sources on the aircraft, and information sources not o the aircraft; and
the allowed use being a use that is free from interference with a use of the essential information on the certified flight deck network; and
using the non-essential information in a manner that is free from interference with the use of the essential information on the certified flight deck network.

12. The method of claim 11, wherein using the non-essential information on the flight deck network comprises using the information on the flight deck network in a manner in which the information is allowed to be used on the flight deck network.

13. The method of claim 12, wherein the manner in which the information is allowed to be used on the flight deck network comprises at least one of:
locations on the flight deck network at which the information is allowed to be displayed;
a number of replications of the information that is allowed to be displayed simultaneously on the flight deck network;
a condition of operation of the aircraft during which the information is allowed to be displayed on the flight deck network; and
allowed integration of the information with information that is certified to be a part of the flight deck network.

14. The method of claim 12, wherein the manner in which the non-essential information is allowed to be used on the flight deck network is selected from:
displaying a stand-alone display of the non-essential information separate from a display of essential information;
graphically integrating the non-essential information with the display of the essential information; and
forming integrated information, via data integration of the non-essential information with the essential information that is certified to be a part of the certified flight deck network, before generating a display of the integrated information.

15. The method of claim 11, wherein:
the non-essential information comprises information selected from information that is operationally approved information and useful information that is useful for the operation of the aircraft but is non-essential for safe operation of the aircraft; and
the essential information comprises information selected from information certified by the regulatory authority to be a part of the flight deck network and information that is required to be displayed on the flight deck network for the safe operation of the aircraft.

16. An apparatus comprising an information controller on an aircraft comprising:
an information receiver that receives information from a number of information sources other than a certified flight deck network on the aircraft, the certified flight deck network forming a closed system requiring: separation of essential information from data processing systems other than the flight deck network, and a certification from a regulatory authority, the essential information comprising information required for a safe operation of a flight of the aircraft;
an approved information checker that determines whether the information from the number of information sources other than the certified flight deck network received by the information receiver is approved to be used on the certified flight deck network;
an allowed uses tagger that indicates a manner in which the information from the number of information sources other than the certified flight deck network is allowed to be used on the certified flight deck network via a tag added to the information from the number of information sources other than the certified flight deck network received by the information receiver; and an information request handler that receives a request from the certified flight deck network during operation of the aircraft to send the information from the number of information sources other than the certified flight deck network to the certified flight deck network, and, in response to the request, and sends the information from the number of information sources other than the certified flight deck network that is determined to be approved to be used on the certified flight deck network with the tag to the certified flight deck network.

17. The apparatus of claim 16, wherein the tag indicates at least one of:
locations on the certified flight deck network at which the information from the number of information sources not part of the certified flight deck network is allowed to be displayed;
a number of replications of the information from the number of information sources not part of the certified flight deck network that is allowed to be displayed simultaneously on the certified flight deck network;
a condition of operation of the aircraft during which the information from the number of information sources not part of the certified flight deck network is allowed to be displayed on the certified flight deck network; and
allowed integration of the information from the number of information sources not part of the certified flight deck network with information that is certified to be a part of the certified flight deck network.

18. The apparatus of claim 16, wherein the tag indicates at least one of:
the information from the number of information sources not part of the certified flight deck network is allowed to be displayed on the certified flight deck network as a stand-alone display of the information from the number of information sources not part of the certified flight deck network separate from a display of information that is certified to be a part of the certified flight deck network;
a display of the information from the number of information sources other than the certified flight deck network is allowed to be graphically integrated with the display of information that is certified to be a part of the certified flight deck network; and
the information from the number of information sources not part of the certified flight deck network is allowed to be integrated with information that is certified to be a part of the certified flight deck network, forming integrated information, before generating the display of the integrated information.

19. The apparatus of claim 16, wherein the information request handler sends the information from the number of information sources other than the certified flight deck network that is determined to be approved to be used on the certified flight deck network to the certified flight deck network during the operation of the aircraft, and simultaneously displays on the flight deck network:
the information from the number of information sources other than the certified flight deck network that is determined to be approved to be used on the certified flight deck network to the certified flight deck network during the operation of the aircraft; and other information required for a safe conduct of the flight.

* * * * *